(12) United States Patent
Davare et al.

(10) Patent No.: US 11,557,982 B2
(45) Date of Patent: Jan. 17, 2023

(54) AC/DC POWER CONVERTERS INCLUDING CURRENT TRANSFORMERS FOR BIDIRECTIONAL CURRENT SENSING

(71) Applicant: Astec International Limited, Kowloon (HK)

(72) Inventors: Rahul Vinaykumar Davare, Eden Prairie, MN (US); Todd Martin Schaible, Orono, MN (US)

(73) Assignee: Astec International Limited, Kowloon (HK)

( * ) Notice: Subject to any disclaimer, the term of this patent is extended or adjusted under 35 U.S.C. 154(b) by 0 days.

(21) Appl. No.: 17/376,772

(22) Filed: Jul. 15, 2021

(65) Prior Publication Data
US 2021/0344278 A1   Nov. 4, 2021

Related U.S. Application Data

(63) Continuation of application No. 16/841,034, filed on Apr. 6, 2020, now Pat. No. 11,081,971.

(51) Int. Cl.
*H02M 7/219* (2006.01)
*H02M 1/42* (2007.01)

(52) U.S. Cl.
CPC ......... *H02M 7/219* (2013.01); *H02M 1/4258* (2013.01); *H02M 7/2195* (2021.05)

(58) Field of Classification Search
CPC ........ H02M 7/21; H02M 7/217; H02M 7/219; H02M 1/4258; H02M 7/2195
See application file for complete search history.

(56) References Cited

U.S. PATENT DOCUMENTS

| | | | |
|---|---|---|---|
| 8,773,879 B2 | 7/2014 | Gan et al. | |
| 9,997,994 B1 | 6/2018 | Luo et al. | |
| 11,081,971 B1* | 8/2021 | Davare | H02M 1/4258 |
| 2011/0013436 A1 | 1/2011 | Gan et al. | |

(Continued)

FOREIGN PATENT DOCUMENTS

CN   206490578 U   9/2017

OTHER PUBLICATIONS

Seiji Iyasu et al,; A Bidirectional Current Sensor based on CT with Diode Rectifier and MOSFET for Bidirectional Current-fed DC-DC Converter, IEEJ Journal of Industry Applications, vol. 8, No. 3, pp. 437-443, 2019; 7 pages.

(Continued)

*Primary Examiner* — Adolf D Berhane

(57) ABSTRACT

An AC/DC power converter includes input terminals, output terminals, a power factor correction circuit coupled between the input and output terminals and including at least one power switch defining a switched current path, and a current transformer including a primary winding and a secondary winding. The primary winding is coupled in series with the switched current path. The power converter also includes a first sense switch coupled with a first end of the secondary winding, a second sense switch coupled with a second end of the secondary winding, and a control circuit. The control circuit is configured to turn on the first sense switch and turn off the second sense switch during a positive polarity of the AC voltage input, and to turn off the first sense switch and turn on the second sense switch during a negative polarity of the AC voltage input.

20 Claims, 16 Drawing Sheets

(56) References Cited

U.S. PATENT DOCUMENTS

| | | |
|---|---|---|
| 2016/0028304 A1 | 1/2016 | O'Day |
| 2019/0146014 A1 | 5/2019 | Pohlmann et al. |
| 2019/0305671 A1 | 10/2019 | Matsuura et al. |

OTHER PUBLICATIONS

International Search Report and Written Opinion for PCT Application No. PCT/US2021/025119, filed Mar. 31, 2021; dated Jul. 6, 2021; 13 pages.

* cited by examiner

AC/DC POWER CONVERTERS INCLUDING CURRENT TRANSFORMERS FOR BIDIRECTIONAL CURRENT SENSING

CROSS-REFERENCE TO RELATED APPLICATIONS

This application claims the benefit of and priority to U.S. application Ser. No. 16/841,034 filed Apr. 6, 2020. The entire disclosure of the above application is incorporated herein by reference.

FIELD

The present disclosure relates to AC/DC power converters including current transformers for bidirectional current sensing.

BACKGROUND

This section provides background information related to the present disclosure which is not necessarily prior art.

AC/DC power converters may include circuit arrangement topologies where current through power switches changes direction during positive and negative half cycles of an AC voltage input. Current transformers may be used to sense current through different portions of the power converter circuit.

FIGS. 1A and 1B illustrate an example power converter 100 according to the prior art. A primary winding P1 of a current transformer CT1 is coupled in series with the power switches Q3 and Q4, and a single switch Q1 is coupled with the secondary winding S1 of the current transformer CT1.

A control circuit 101 is configured to turn on and turn off the switch Q1 according to a switching frequency of the power switches Q3 and Q4 (e.g., a PWM signal with a kHz frequency, etc.). The control circuit 101 may receive a sensed current of the power switches Q3 and Q4 at a node 112 coupled between the switch Q1 and the resistor R1. This circuit arrangement may provide drawbacks, such as voltage spikes on the resistor R1 due to charging and discharging cycles at the gate of the switch Q1 as the switch Q1 is turned on and off according to an AC switching frequency of the power switches Q3 and Q4 (e.g., to allow the transformer CT1 to reset, etc.).

FIG. 2 illustrates a transformer secondary side current sensing circuit having a single switch Q1, according to the prior art. As shown in FIG. 2, the switch Q1 is not coupled between the resistor R1 and the current transformer TX1, to reduce voltage spikes on the resistor R1. A control circuit may sense current of the primary side power switches at the node 212.

SUMMARY

This section provides a general summary of the disclosure, and is not a comprehensive disclosure of its full scope or all of its features.

According to one aspect of the present disclosure, an AC/DC power converter includes a pair of input terminals for receiving an alternating current (AC) voltage input from an input power source, a pair of output terminals for supplying a direct current (DC) voltage output to a load, and a power factor correction circuit coupled between the pair of input terminals and the pair of output terminals. The power factor correction circuit includes at least one power switch defining a switched current path. The power converter includes a current transformer having a primary winding and a secondary winding. The primary winding is coupled in series with the switched current path, and the secondary winding includes a first end and a second end opposite the first end. The power converter also includes a bridge rectifier coupled with the first and second ends of the secondary winding, a first sense switch coupled with the bridge rectifier, and a second sense switch coupled with the bridge rectifier. The control circuit is configured to turn on the first sense switch and turn off the second sense switch during a positive polarity of the AC voltage input, and to turn off the first sense switch and turn on the second sense switch during a negative polarity of the AC voltage input.

According to another aspect of the present disclosure, a bidirectional current sensing circuit for an AC/DC power converter includes a current transformer including a primary winding and a secondary winding. The primary winding is coupled in series with a switched current path of the AC/DC power converter. The circuit also includes a bridge rectifier coupled with the secondary winding, a first sense switch and a second sense switch each coupled with the bridge rectifier, and a control circuit configured to turn on the first sense switch and turn off the second sense switch during a positive polarity of an AC voltage input of the AC/DC power converter, and to turn off the first sense switch and turn on the second sense switch during a negative polarity of the AC voltage input.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts or features throughout the several views of the drawings.

DETAILED DESCRIPTION

Figure 1B:
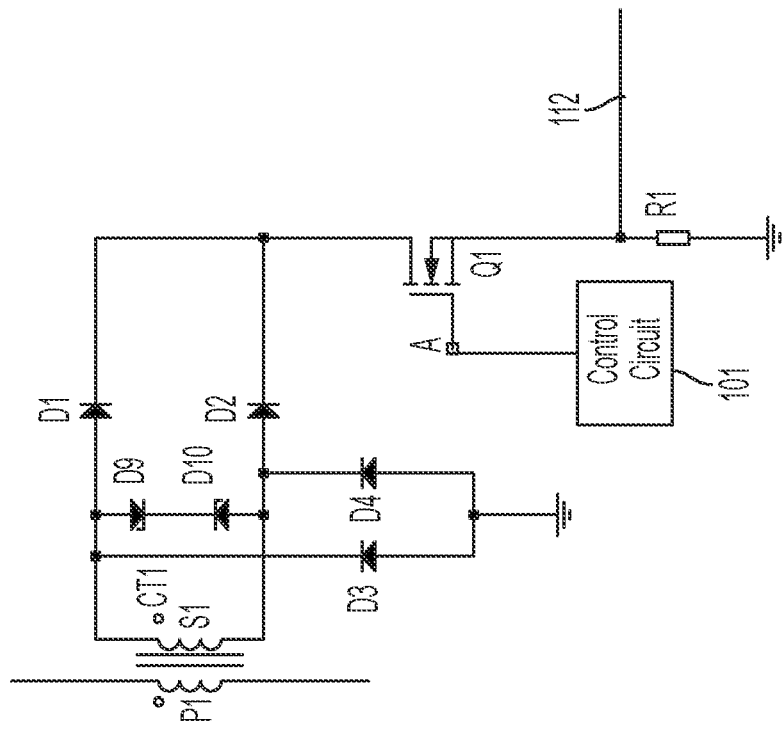
FIGS. 1A and 1B are circuit diagrams of an AC/DC power converter including one current sense switch, according to the prior art.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figures 3A, 3B:
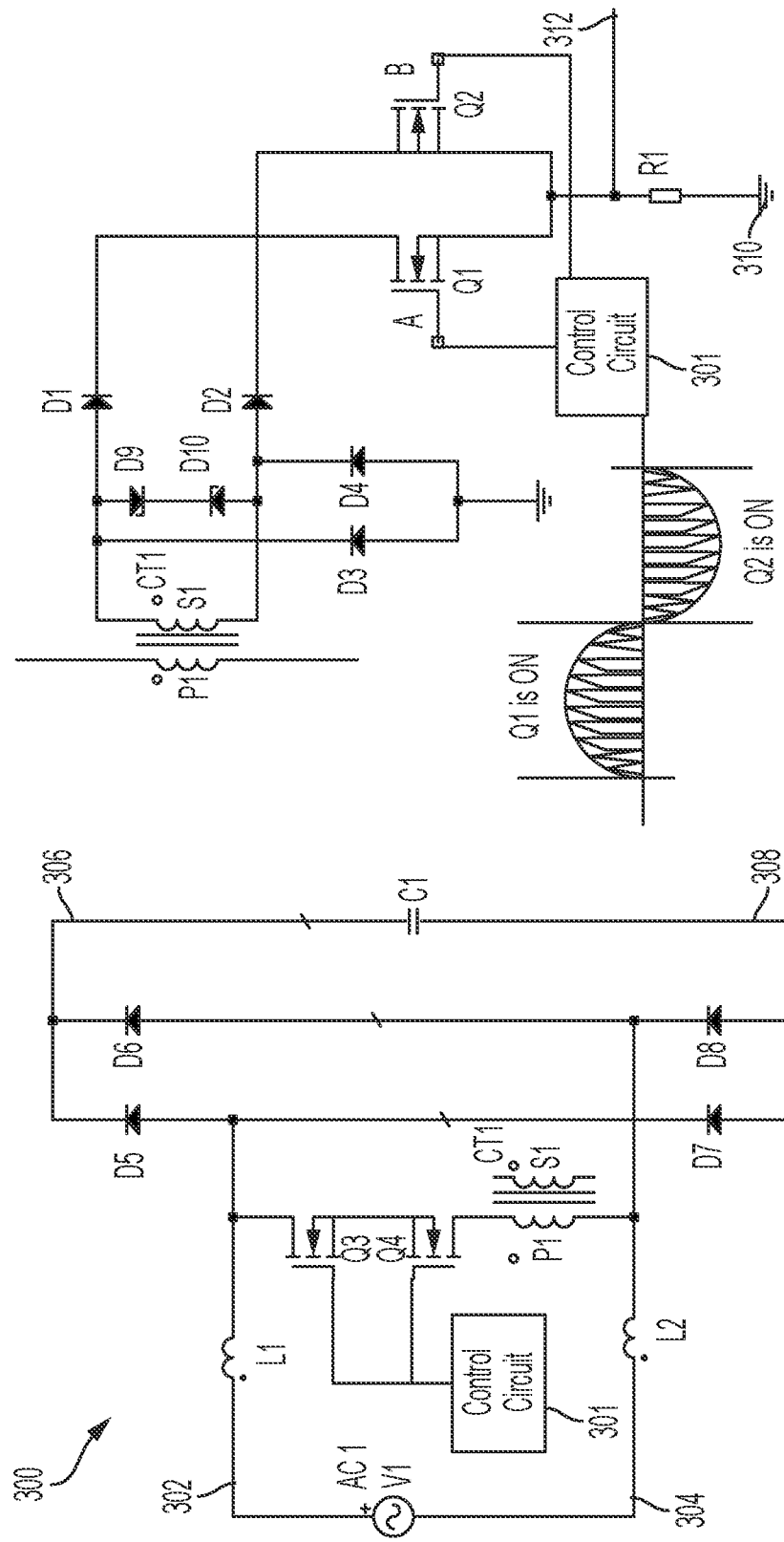
FIGS. 3A and 3B are circuit diagrams of an AC/DC power converter, according to one example embodiment of the present disclosure.

An AC/DC power converter according to one example embodiment of the present disclosure is illustrated in FIGS. 3A and 3B, and indicated generally by reference number 300. The power supply 300 includes a pair of input terminals 302 and 304 for receiving an alternating current (AC) voltage input V1 from an input power source AC1, and a pair of output terminals 306 and 308 for supplying a direct current (DC) voltage output to a load.

As shown in FIG. 3A, power switches Q3 and Q4 are coupled in a bridgeless power factor correction (PFC) circuit between the pair of input terminals 302, 304 and the pair of output terminals 306, 308. The power switches Q3 and Q4 define a switched current path. A current transformer CT1 includes a primary winding P1 and a secondary winding S1. The primary winding P1 is coupled in series with the switched current path defined by the power switches Q3 and Q4.

FIG. 3A illustrates the location of the current transformer CT1 relative to the power switches Q3 and Q4, while FIG. 3B illustrates details of the current sense circuit coupled with the secondary winding S1 of the current transformer CT1. As shown in FIG. 3B, the power converter 300 includes a bridge rectifier having diodes D1, D2, D3 and D4 coupled with opposite ends of the secondary winding S1. A switch Q1 is coupled with the diode D1, and a switch Q2 is coupled with the diode D2.

A control circuit 301 supplies a control signal A to the switch Q1 and a control signal B to the switch Q2. The control circuit 301 is configured to turn on the switch Q1 and turn off the switch Q2 during a positive polarity of the AC voltage input V1, and to turn off the switch Q1 and turn on the switch Q2 during a negative polarity of the AC voltage input V1.

For example, the AC voltage input V1 may alternate between the positive polarity and the negative polarity at a line frequency (e.g., about sixty Hertz, less than 1 kHz, etc.). The control circuit may be configured to turn on and turn off the switches Q1 and Q2 according to the line frequency (e.g., in synchronization with the line frequency, etc.).

The control circuit 301 may include any suitable microprocessor, microcontroller, integrated circuit, digital signal processor, continuous conduction mode (CCM) power factor correction (PFC) controller, boundary conduction mode (BCM) PFC controller, etc., which may include memory.

The control circuit 301 may be configured to perform (e.g., operable to perform, etc.) any of the example processes described herein using any suitable hardware and/or software implementation. For example, the control circuit 301 may execute computer-executable instructions stored in a memory, may include one or more logic gates, control circuitry, etc. voltages as described above.

Figure 1A:
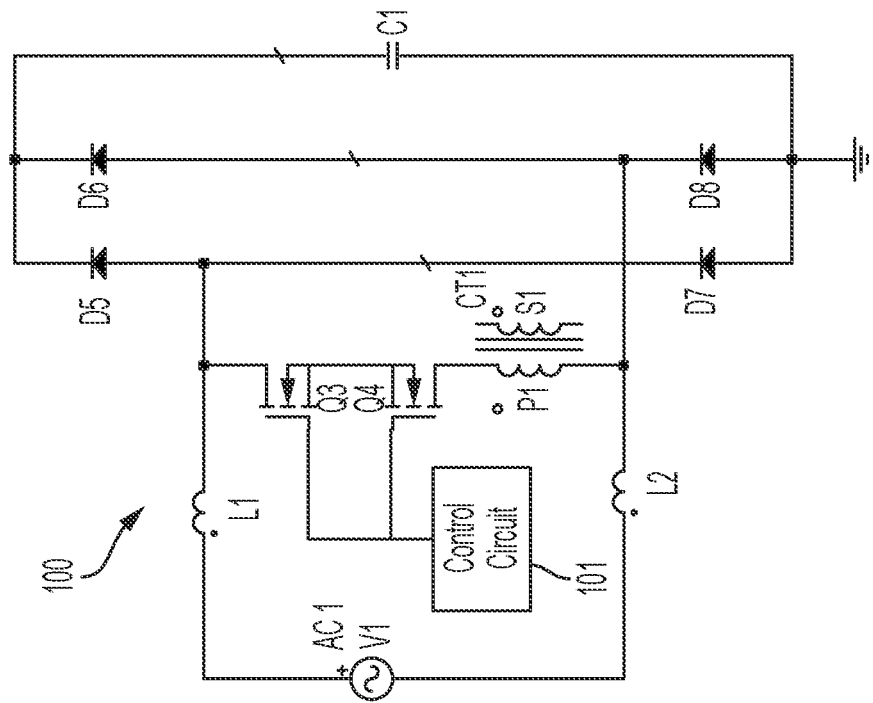
Figure 2:
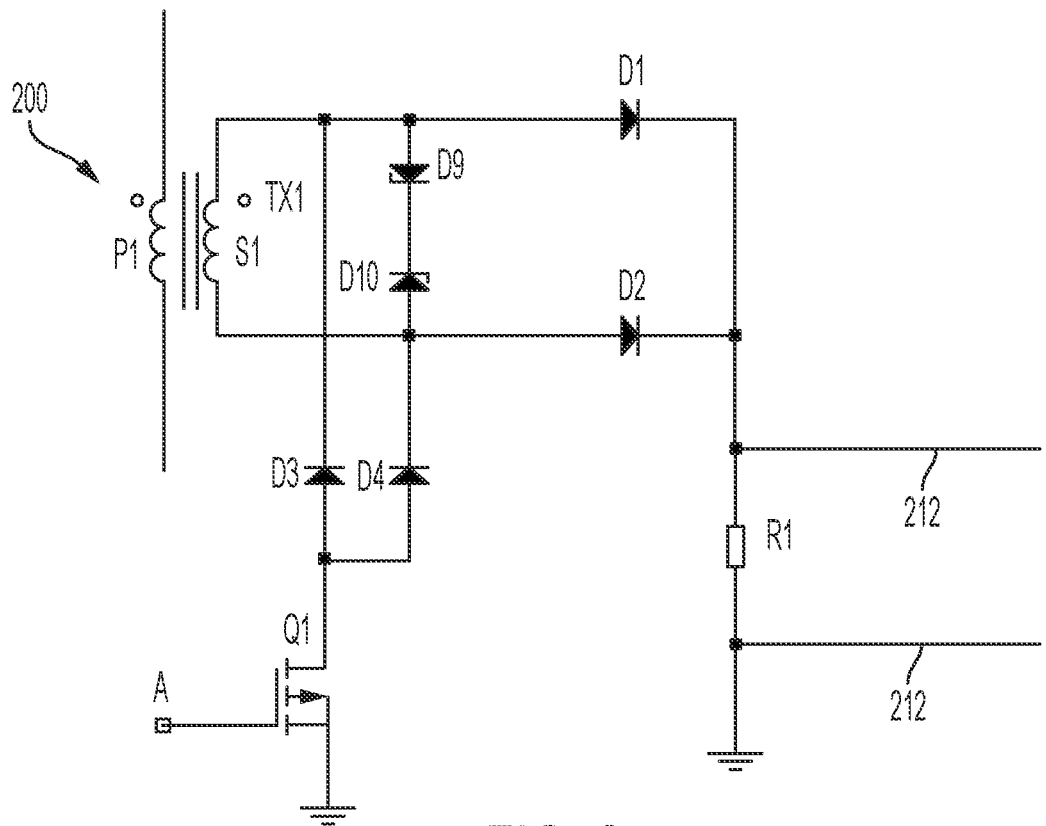
FIG. 2 is a circuit diagram of another current transformer secondary side circuit, according to the prior art.

A single control circuit 301 may control the power switches Q3 and Q4, and the secondary side circuit switches Q1 and Q2. In some embodiments, different control circuits may be used for the power switches Q3 and Q4, and the secondary side circuit switches Q1 and Q2. The control circuit 301 may be the same as the control circuit 101 of FIG. 1, or may be a different control circuit.

Figure 4:
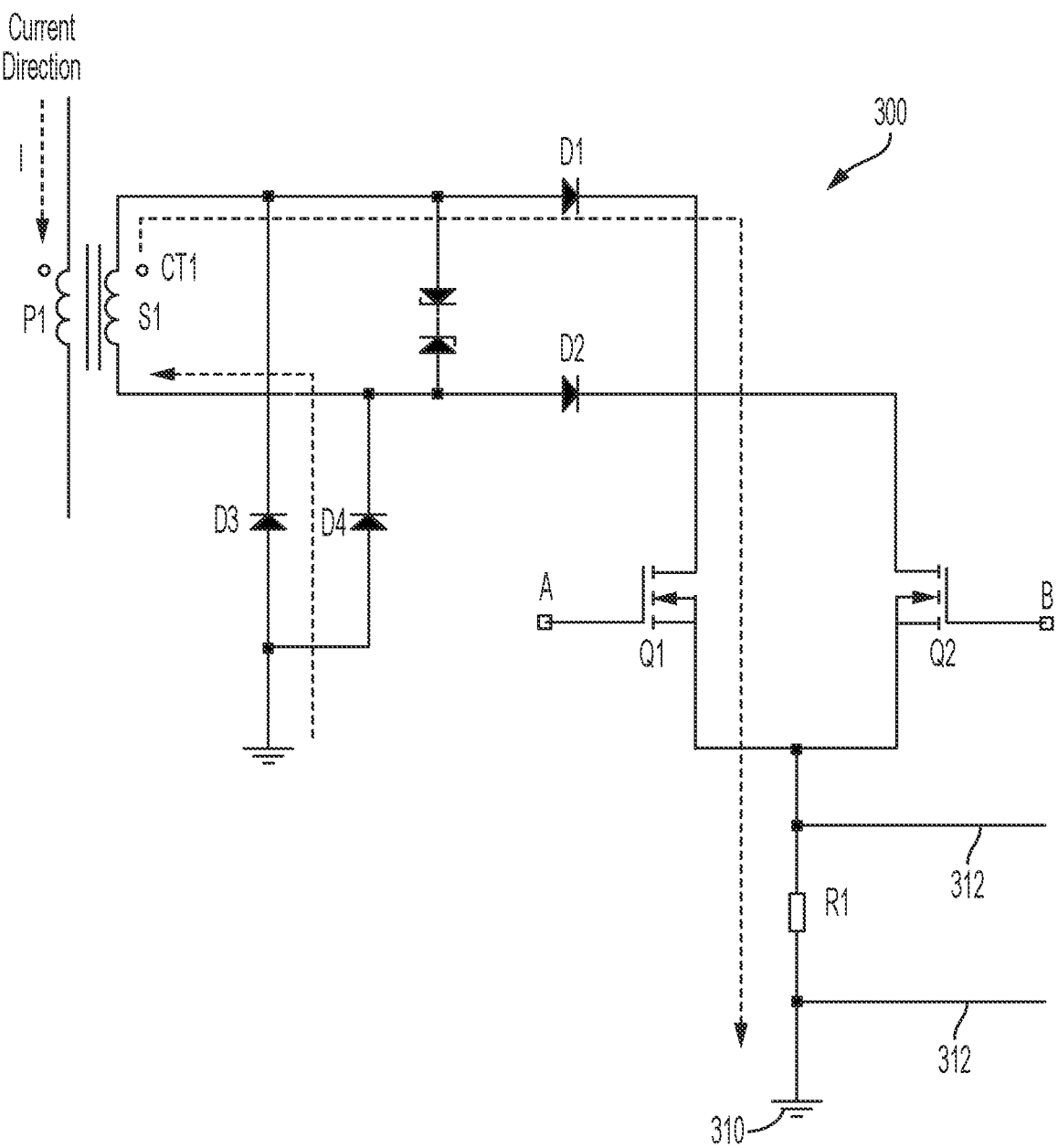
FIG. 4 is a circuit diagram of an example current path through a transformer secondary side circuit of FIG. 3B during a positive AC input polarity.
Figure 5:
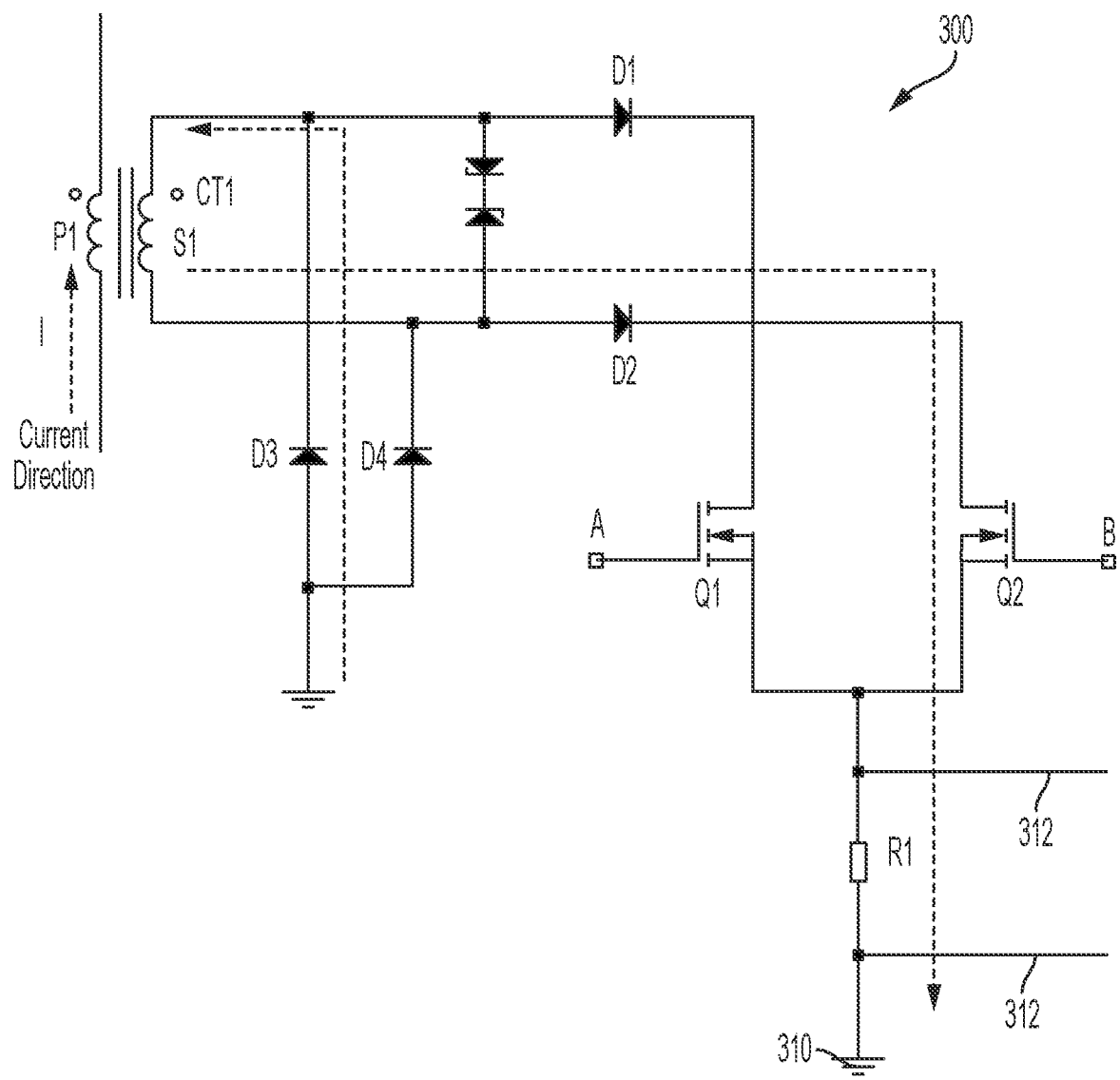
FIG. 5 is a circuit diagram of an example current path through the transformer secondary side circuit of FIG. 3B during a negative AC input polarity.

FIGS. 4 and 5 illustrate example current paths through the current transformer CT1 and the switches Q1 and Q2 during positive and negative half cycles of the AC voltage input V1. Specifically, FIG. 4 illustrates that during the positive half cycle, the current flows from the secondary winding S1 of the current transformer CT1, through the diode D1 and the switch Q1 (which is turned on during the positive half cycle via the control signal A), and through the resistor R1 (e.g., a burden resistor) to a circuit ground 110. The current returns from the circuit ground 310 to the secondary winding S1 via the diode D4.

FIG. 5 illustrates that during the negative half cycle, the current flows from the untapped secondary winding S1 of the current transformer CT1, through the diode D2 and the switch Q2 (which is turned on during the negative half cycle via the control signal B), and through the resistor R1 to the circuit ground 310. The current returns from the circuit ground 310 to the secondary winding S1 via the diode D3.

As shown in FIGS. 4 and 5, the secondary winding S1 of the current transformer CT1 is preferably untapped, and is therefore not center-tapped, does not include any taps after a bifilar winding, and is not coupled in series with any other secondary winding of the current transformer CT1.

The arrangement of the current transformer CT1 and the switches Q1 and Q2 allow for bidirectional current sensing (e.g., of current through the switches Q3 and Q4), in a simple and cost-effective manner. For example, a current sense signal may be supplied to the control circuit at node 312 (e.g., a node between the switches Q1 and Q2 and the resistor R1).

As shown in FIG. 3B, during a positive half cycle the switch Q1 may be turned on to detect current in the positive direction as the switches Q3 and Q4 are turned on and turned off according to a switching frequency (e.g., according to a pulse-width modulated (PWM) signal, etc.), and during a negative half cycle the switch Q2 may be turned on to detect current in the negative direction as the switches Q3 and Q4 are turned on and turned off according to the switching frequency.

As mentioned above, the switches Q1 and Q2 may be switched according to the line frequency of the AC voltage input V1, and may be switched when the AC voltage input V1 is near or at zero (e.g., within one volt of zero, within five percent of zero relative to a maximum value of V1, etc.). For example, the switches Q1 and Q2 may be switched as the voltage of the AC voltage input V1 crosses zero, according to the polarity change of the AC voltage input V1 as it crosses zero. A simple control circuit (e.g., a microcontroller, a digital signal processor (DSP), a discrete logic circuit, etc.) may be used because the turn on and turn off timing of the switches Q1 and Q2 may be less critical that if the switches Q1 and Q2 were switched at a higher frequency on non-zero voltages.

Using two switches Q1 and Q2 avoids the need to turn on and turn off a switch at the same switching frequency as the switches Q3 and Q4, and may avoid voltage spikes on the resistor R1 that could otherwise occur if only a single switch were used instead of the switches Q1 and Q2 (e.g., due to gate charging and discharging if a switch were turned on and off at the switching frequency to allow the current transformer CT1 to reset, etc.).

As shown in FIGS. 3A and 3B, the power converter 300 includes two inductors L1 and L2 coupled with the AC voltage input V1, and four diodes D5, D6, D7 and D8 coupled with the inductors L1 and L2. A capacitor C1 is coupled with the diodes D5-D8 and across the output terminals 306, 308.

The power converter 300 also includes zener diodes D9 and D10 coupled with the secondary winding S1 of the current transformer CT1. The zener diodes D9 and D10 clamp a reset voltage spike of the bi-directional current transformer CT1 if the voltage spike exceeds the zener rating, to protect the switches Q1 and Q2 and the diodes D1-D4. Although FIG. 3B illustrates the zener diode D9 coupled with one end of the secondary winding S1 and the zener diode D10 coupled with another end of the secondary winding S1, other embodiments may use more or less (or none) of the zener diodes, zener diodes located in other arrangements, etc. For example, the two zener diodes may be connected in series between the cathode of the diode D2 and the circuit ground 310.

In other embodiments, the power converter 300 may include more or less diodes, switches, capacitors and/or inductors. The power converter 300 may include diodes, switches, capacitors and/or inductors coupled in other circuit arrangements (which may or may not be bridgeless), such as totem pole PFCs, Vienna rectifiers, etc. In some embodiments, the current transformer sensing circuits may be used in other bidirectional current sensing applications, such as motor control circuits, DC/AC power inverters including solar inverters, etc.

The switches Q1-Q4 may include any suitable switching devices, such as bipolar-junction switch (BJTs), metal-oxide semiconductor field-effect transistors (MOSFETs), Silicon (Si) transistors, etc. The input terminals 302, 304 and output terminals 306, 308 may include any suitable connectors, wires, leads, etc. for transferring power to and from the power converter 300. The current transformer CT1 may include any suitable transformer for sensing current, and may include any suitable number of windings, layers, wire type, core construction, etc.

Figures 6A, 6B:
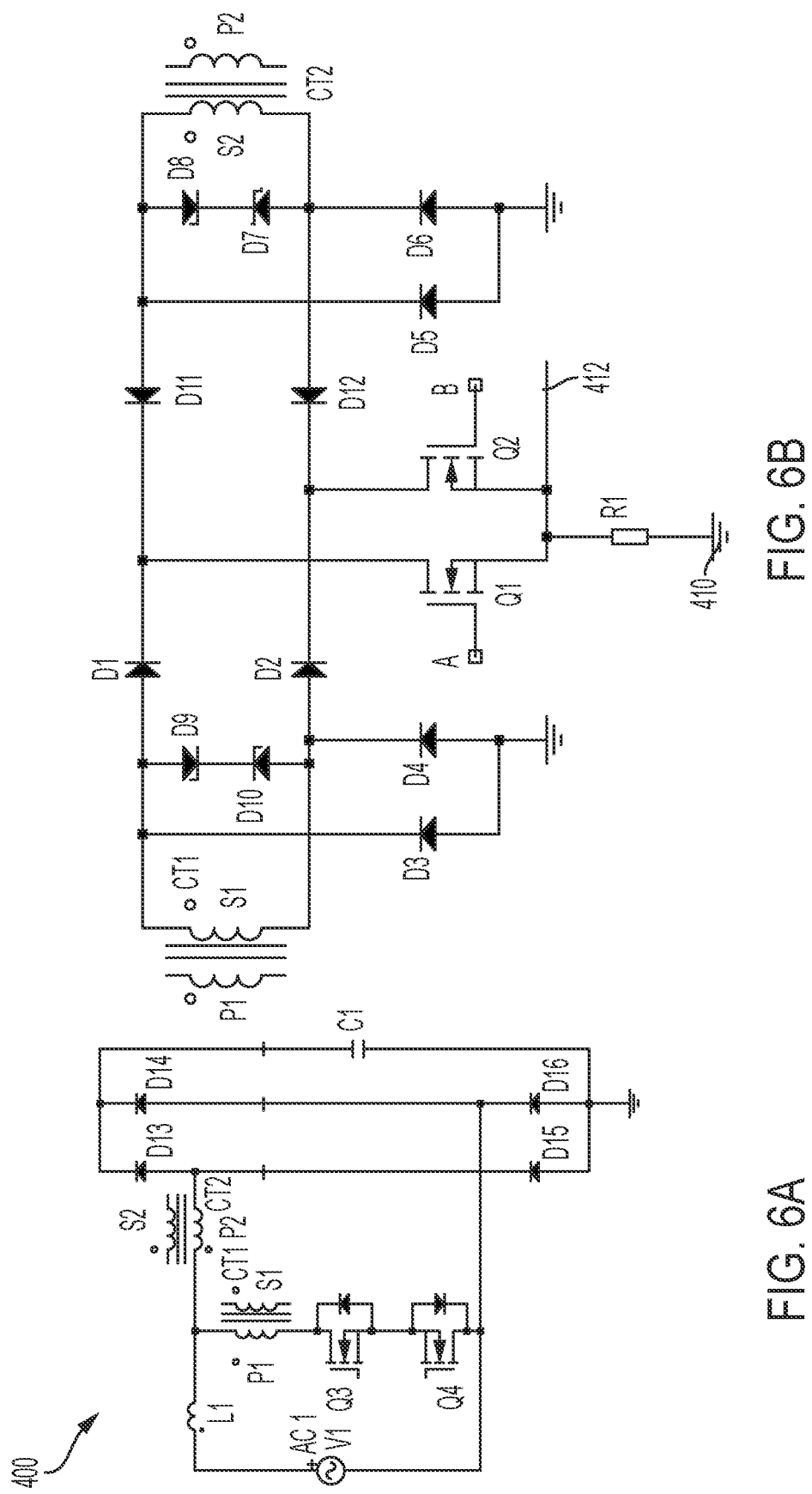
FIGS. 6A and 6B are circuit diagrams of an AC/DC power converter including two current transformers, according to another example embodiment of the present disclosure.

FIGS. 6A and 6B illustrate an AC/DC bridgeless power converter 400 according to another example embodiment of the present disclosure. The power converter 400 includes a current transformer CT1 in series with power switches Q3 and Q4, and another current transformer CT2 having a primary winding P2 coupled between the inductor L1 and the diode D13. The diodes D13, D14, D15 and D16 are connected between the AC voltage input V1 and the capacitor C1. Although FIG. 6B illustrates the current transformer CT2 coupled with a diode D13, in other embodiments the current transformer CT2 may be coupled with a transistor, such as a MOSFET (e.g., an SiC MOSFET, a GaN transistor, etc.).

FIG. 6A illustrates the location of the current transformers CT1 and CT2 with respect to the inductor L1 and the power switches Q1 and Q2, while FIG. 6B illustrates the details of the current sense circuit connected with the secondary windings S1 and S2 of the current transformers CT1 and CT2.

Figure 10:
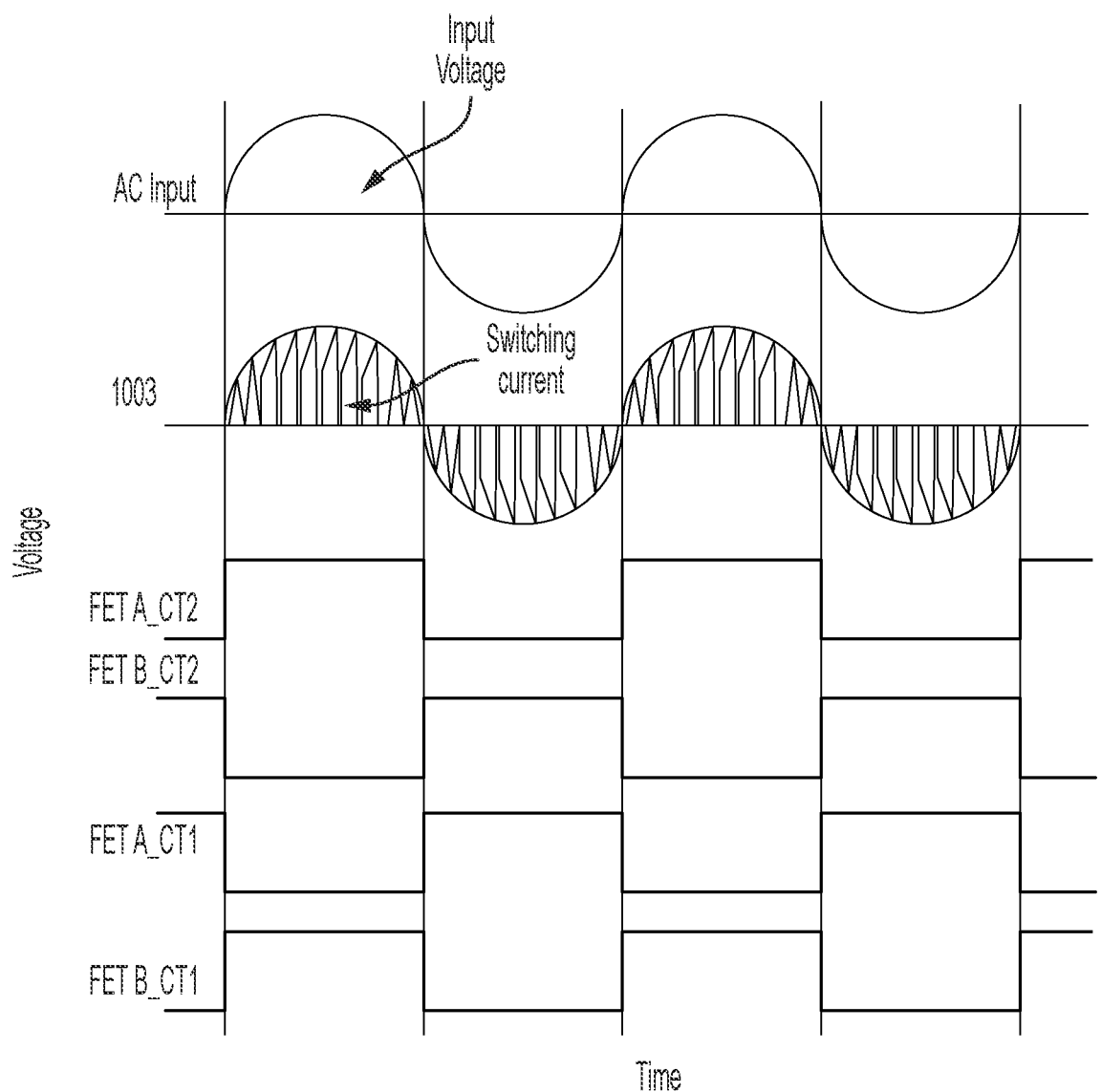
FIG. 10 is a graph of example control signals and voltage waveforms of the power converter of FIG. 8.

For example, the switches Q1 and Q2 are coupled to nodes between the secondary windings of the current transformers CT1, CT2. A control circuit receives a sensed current signal at 412 that is indicative of a total current of the inductor L1. FIG. 10 illustrates an example output waveform 1003 of the sensed current signal at 412 during operation of the power converter 400. Specifically, the current transformer CT1 may sense the current though the power switches Q3 and Q4, while the current transformer CT2 senses the current through the diode D1. A combination of the currents may provide a total current of the inductor L1.

As shown in FIG. 6B, zener diodes D7 and D8 are coupled between opposite ends of the secondary winding S1 of the current transformer CT2, and diodes D9 and D10 are coupled between opposite ends of the secondary winding S1 of the current transformer CT1. The diodes D3 and D4 connect opposite ends of the secondary winding S1 of the current transformer CT1 to the circuit ground 410, and the diodes D5 and D6 connect opposite ends of the secondary winding S1 of the current transformer CT2 to the circuit ground 410.

The diodes D1, D2, D11 and D12 are coupled between the current transformers CT1 and CT2, and the switches Q1 and Q2. Although FIG. 6B illustrates one specific arrangement of the diodes, switches and resistor in the current sensing portion of the power converter 600, other embodiments may include other arrangements of the components.

Figures 7A, 7B:
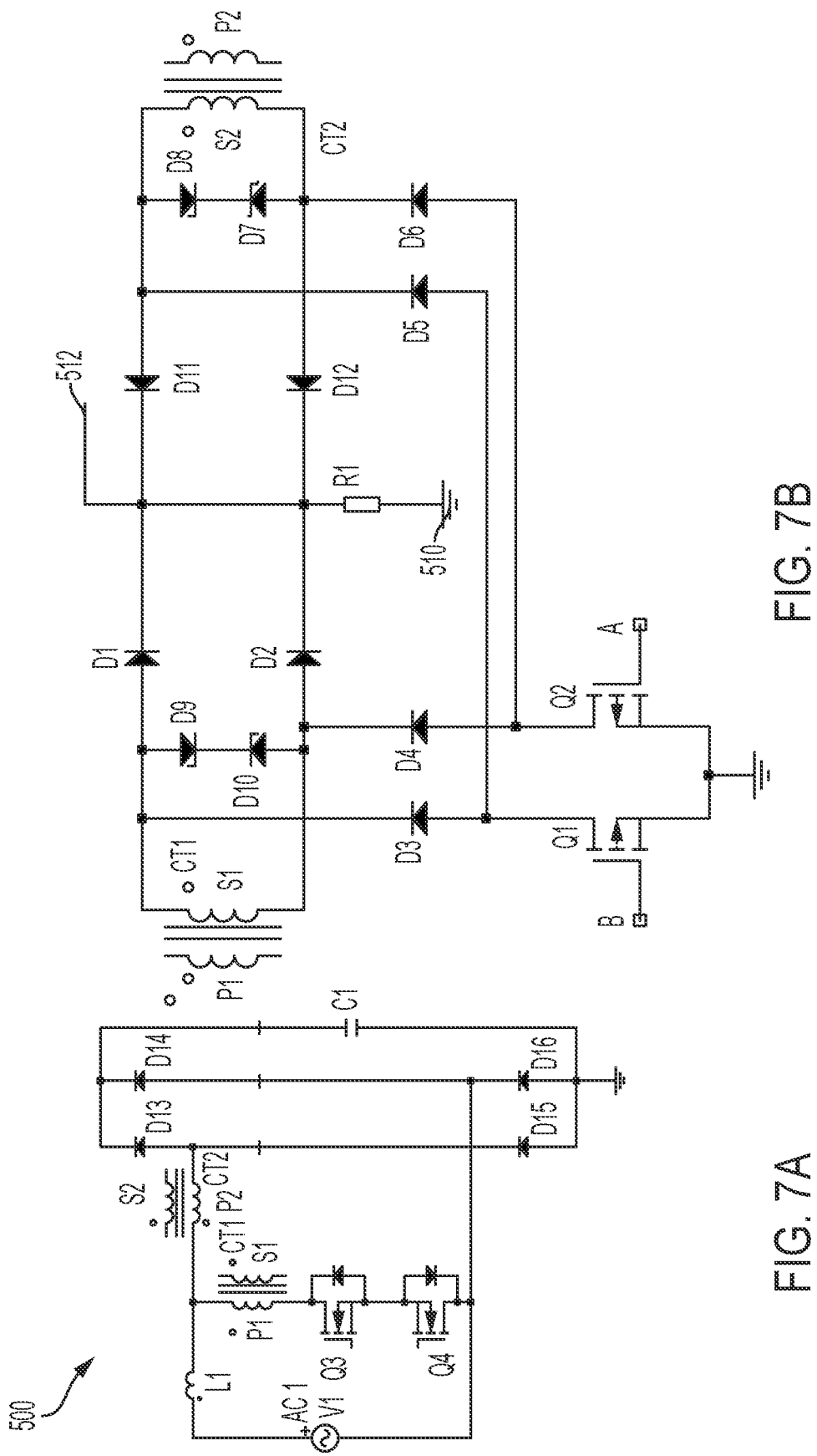
FIGS. 7A and 7B are circuit diagrams of an AC/DC power converter including two current transformers and a sense resistor, according to yet another example embodiment of the present disclosure.

For example, FIGS. 7A and 7B illustrate a power converter 500 according to another example embodiment of the present disclosure, where the switches Q1 and Q2 are not coupled between the resistor R1 and the current transformers CT1 and CT2.

In the power converter 500, the resistor R1 is coupled between the circuit ground 510 and a node located between the diodes D1, D2, D11 and D12. A control circuit may receive a sensed current at the node 512 that is indicative of the total current of the inductor L1.

As shown in FIG. 7B, a diode D3 is coupled between the current transformer CT1 and the switch Q1, a diode D4 is coupled between the current transformer CT1 and the switch Q3, a diode D5 is coupled between the current transformer CT2 and the switch Q1, and a diode D6 is coupled between the current transformer CT2 and the switch Q3.

Figure 7C:
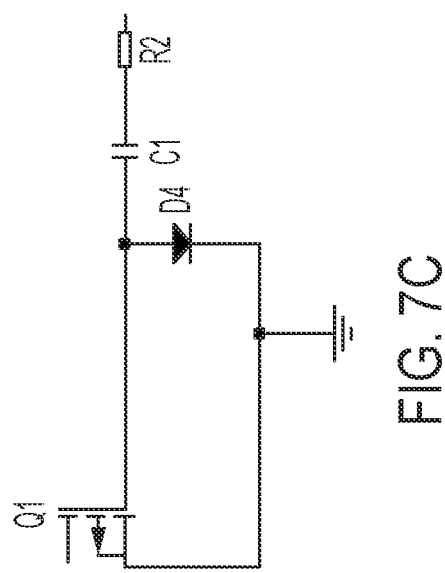
FIG. 7C is a circuit diagram of a drive circuit for a switch of the transformer secondary side circuit of FIG. 7B, according to another example embodiment of the present disclosure.

FIG. 7C illustrates a drive circuit for the switch Q1, which may be a p-channel FET (e.g., a p-channel MOSFET may be used in the bottom side of the current transformer rectifier bridge). The drive circuit includes a diode D4, a capacitor C1 and a resistor R2, and may be configured to turn on and turn off the switch Q1 at a switching frequency that is the same as power switches of the power converter.

Figure 8:
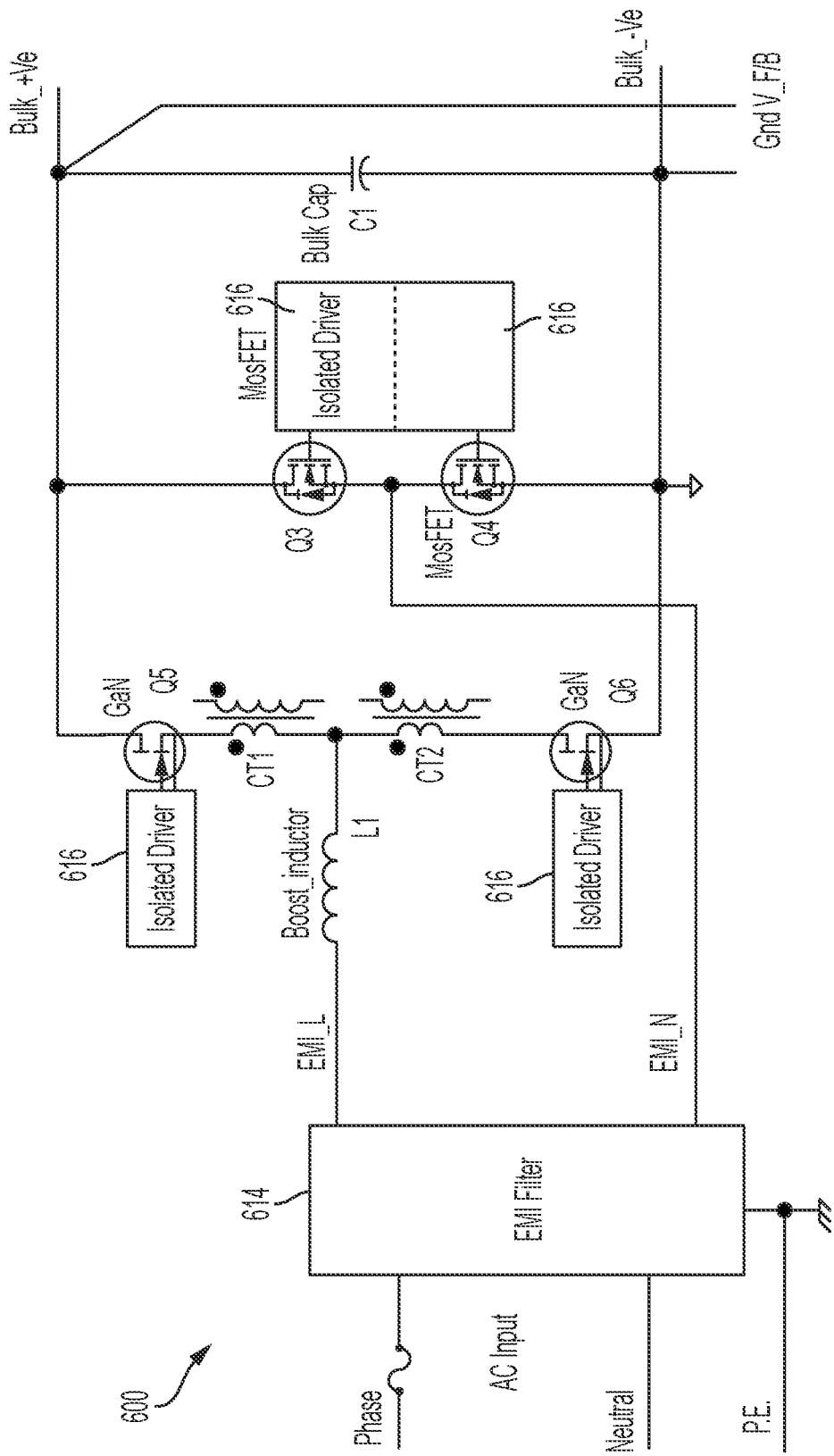
FIG. 8 is a circuit diagram of a totem pole power factor correction power (PFC) converter, according to an example embodiment of the present disclosure.

FIG. 8 illustrates an AC/DC bridgeless power converter 400 that includes a totem pole power factor correction (PFC) circuit arrangement. As shown in FIG. 8, the power converter 600 includes an electromagnetic interference (EMI) filter 614 that receives an AC voltage input from phase and neutral terminals. The EMI filter 614 is connected with a protective earth ground P.E.

The EMI filter 614 supplies line (EMI_L) and neutral (EMI_N) to a boost inductor L1. The switches Q3, Q4, Q5 and Q6 are connected in a totem pole circuit arrangement and driven by a control circuit including isolated drivers 616. The switches Q3-Q6 may include any suitable switches, such as GaN metal-oxide semiconductor field-effect transistors (MOSFETs), etc. A bulk capacitor C1 supplies an output voltage to the output terminals Bulk_+Ve and Bulk_−Ve.

Figure 9:
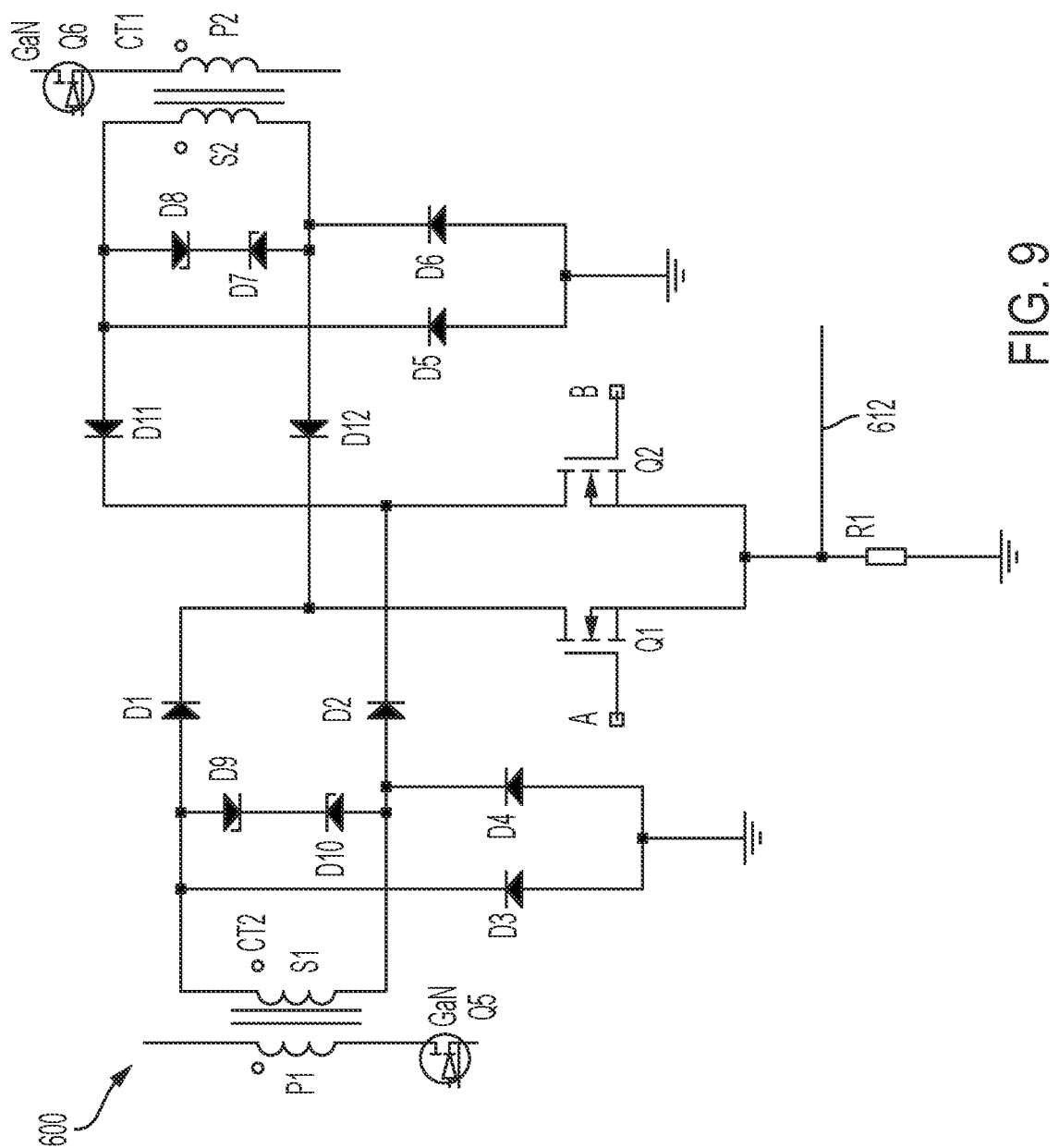
FIG. 9 is a circuit diagram of a current sense circuit of the power converter of FIG. 8.

A first current transformer CT1 is coupled in series with the switch Q5 and a second current transformer CT2 is coupled in series with the switch Q6. FIG. 9 illustrates an example current sensing circuit coupled between the current transformers CT1 and CT2 in the power converter 400.

For example, the circuit in FIG. 9 may be similar to the circuit of FIG. 6B. As shown in FIG. 9, the switches Q1 and Q2 are coupled between the resistor R1 and the secondary windings of the current transformers CT1 and CT2. The switches Q1 and Q2 may be switched at the line frequency via the control signals A and B, and a control circuit may measure a bidirectional total current of the inductor at a node 612.

FIG. 10 illustrates example control signals and current waveforms for the power converter 600 of FIGS. 8 and 9. As shown in FIG. 10, during a positive half cycle of the AC input voltage, a control signal A to a FET coupled with the current transformer CT1 and a control signal A to a FET coupled with the current transformer CT2 may be both be high, while the control signals B are low.

Conversely, during a negative half cycle of the AC input voltage, the control signal B to another FET coupled with the current transformer CT1 and the control signal B to another FET coupled with the current transformer CT2 may be both be high, while the control signals A are low. Because the FETs for both current transformers CT1 and CT2 would be switched identically, a single set of switches Q1 and Q2 may be used for both of the current transformers CT1 and CT2 in FIG. 9.

In some embodiments, the same control switch(es) may be used for a power switch current transformer sensing and power diode or switch side current sensing. This may be particularly advantageous in an interleaved power stage configuration where one or more of the current return paths is shared by both power stages and the current transformer position is restricted by the circuit arrangement.

Figure 11:
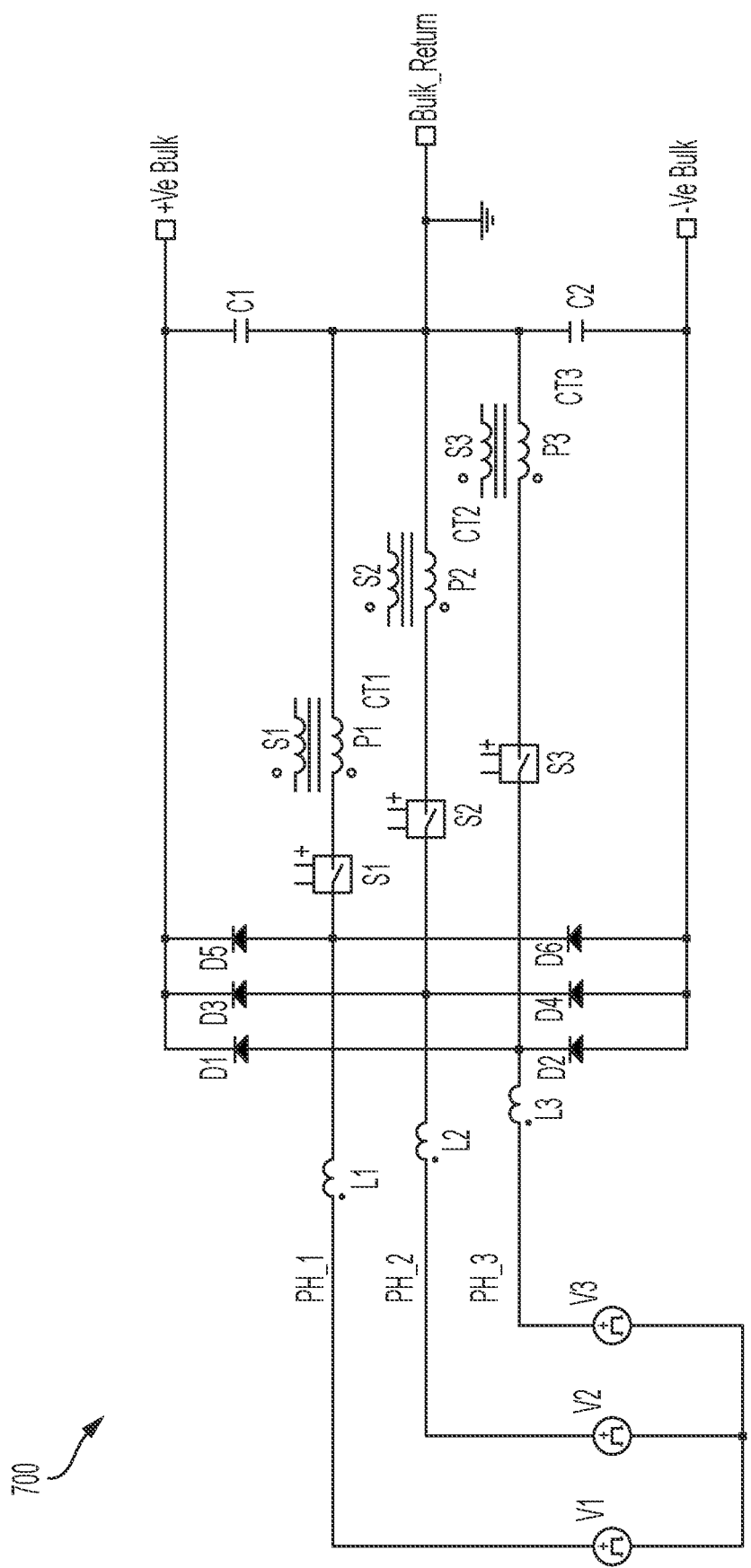
FIG. 11 is a circuit diagram of a Vienna rectifier circuit arrangement, according to an example embodiment of the present disclosure.

FIG. 11 illustrates a power converter 700 that includes a Vienna rectifier circuit. As shown in FIG. 11, the power converter 700 includes three phase legs PH_1, PH_2 and PH_3. The phase leg PH_1 includes a voltage source V1, and a current transformer CT1 in series with a power switch S1.

The phase leg PH_2 includes a voltage source V2, and a current transformer CT2 in series with a power switch S2, and the phase leg PH_3 includes a voltage source V3, and a current transformer CT3 in series with a power switch S3.

Each current transformer CT1, CT2 and CT3 may sense bidirectional current in its corresponding phase leg PH_1, PH_2 or PH_3. For example, a secondary side circuit of each current transformer CT1, CT2 and CT3 may be similar to the circuit of FIG. 3B, the circuit of FIG. 12, etc. A control signal for switches in the secondary side circuits may be generated by sensing individual phase voltages with respect to the Bulk_Return node, and a DSP, microprocessor, etc. may be used to detect polarity of the individual phases.

As shown in FIG. 11, the power converter 700 includes diodes D1, D2, D3, D4, D5 and D6 coupled between corresponding inductors L1, L2 or L3, and the output nodes +Ve_Bulk and −Ve_Bulk. The capacitors C1 and C2 are coupled between the node Bulk_Return a corresponding one of the output nodes +Ve_Bulk and −Ve_Bulk. In other embodiments, the power converter 700 may use other Vienna rectifier circuit arrangements, including more or less circuit components.

Figure 12:
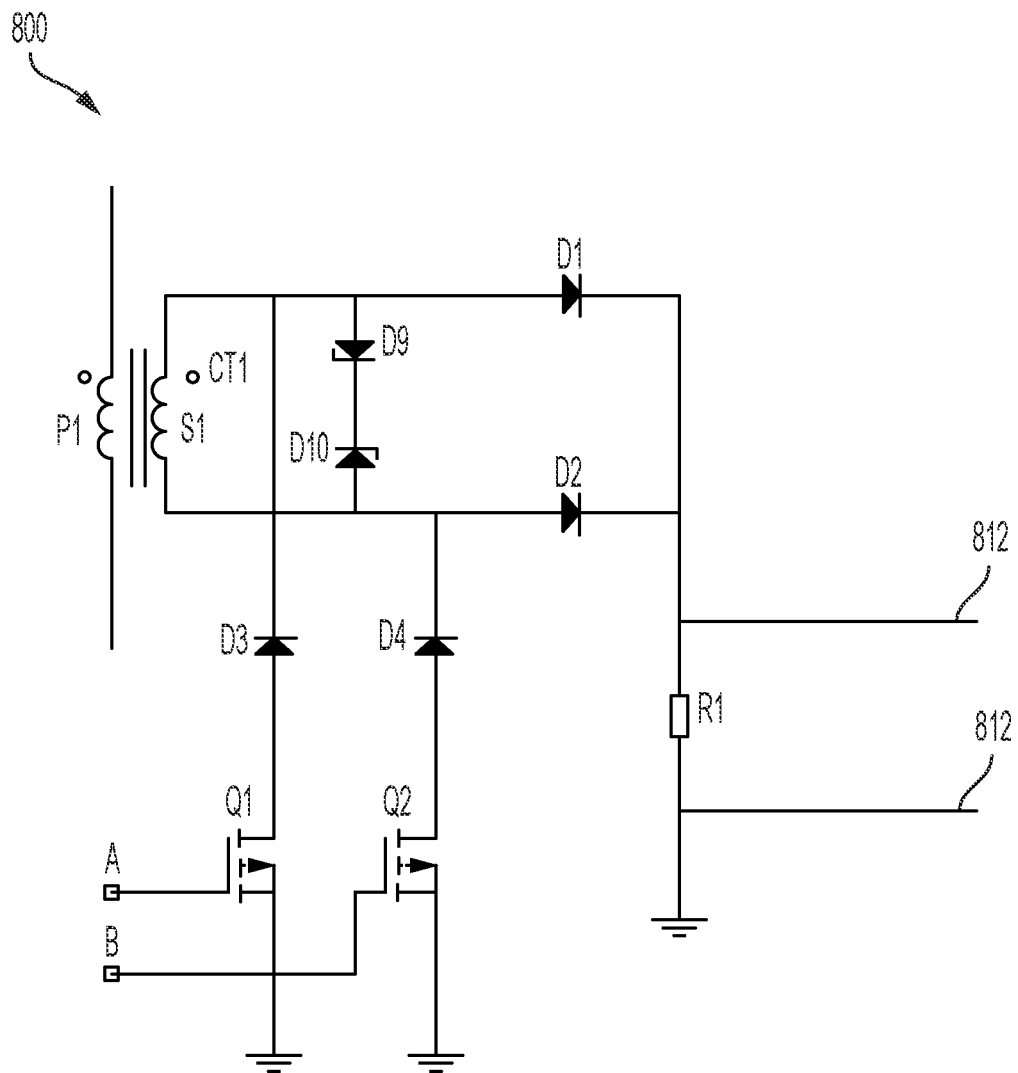
FIG. 12 is a circuit diagram of a current sense circuit including two current sense switches, according to yet another example embodiment of the present disclosure.

FIG. 12 illustrates a current sense circuit 800 including two switches Q1 and Q2, according to another example embodiment of the present disclosure. As shown in FIG. 12, the switches Q1 and Q2 are not coupled between the resistor R1 and the current transformer CT1. A control circuit may receive a sensed current at the node 812.

Figure 13:
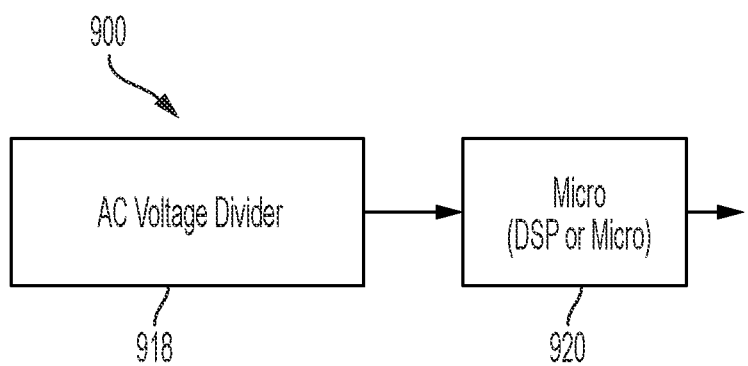
FIG. 13 is a block diagram of an example control circuit for the power converter of FIGS. 3A and 3B.
Figure 14:
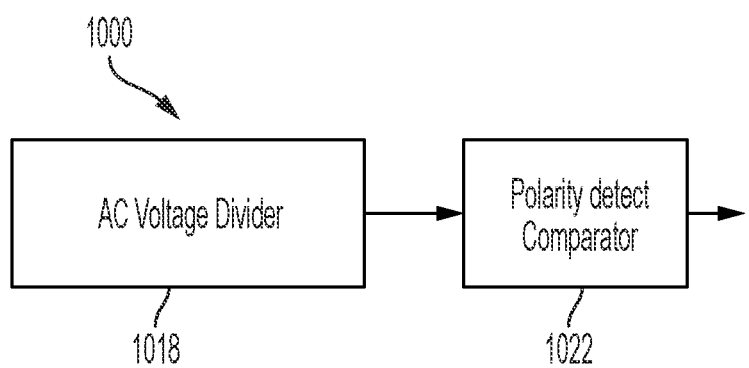
FIG. 14 is a block diagram of an example analog control circuit for the power converter of FIGS. 3A and 3B.
Figure 15:
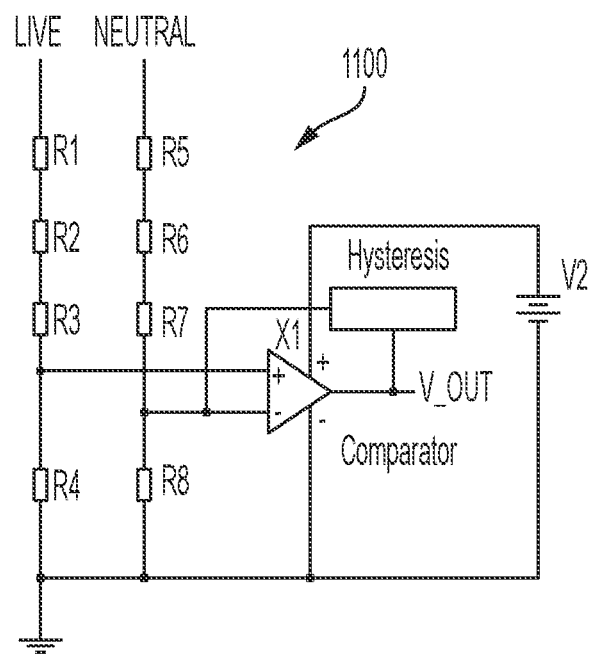
FIG. 15 is an example circuit diagram of the analog control circuit of FIG. 14.

FIGS. 13-15 illustrate example control circuit configurations for the power converters described herein. For example, as shown in FIG. 13, a power converter 900 may include an AC voltage divider 918 and a digital controller 920 (e.g., a microcontroller, a digital signal processor (DSP), etc.). The digital controller 920 may already be able to perform and/or detect polarity information, zero-crossing information, etc., of an AC input.

FIG. 14 illustrates an example analog control circuit 1000 including an AC voltage divider 1018 and a polarity detection comparator 1022. For example, FIG. 15 illustrates an analog circuit 1100 where the resistors R1, R2, R3 and R4 are connected with a LIVE terminal, and the resistors R5, R6, R7 and R8 are connected with the NEUTRAL terminal. A comparator X1 receives the voltage divider output and supplies a signal V_OUT, which uses hysteresis and a voltage supply V2.

Figure 16:
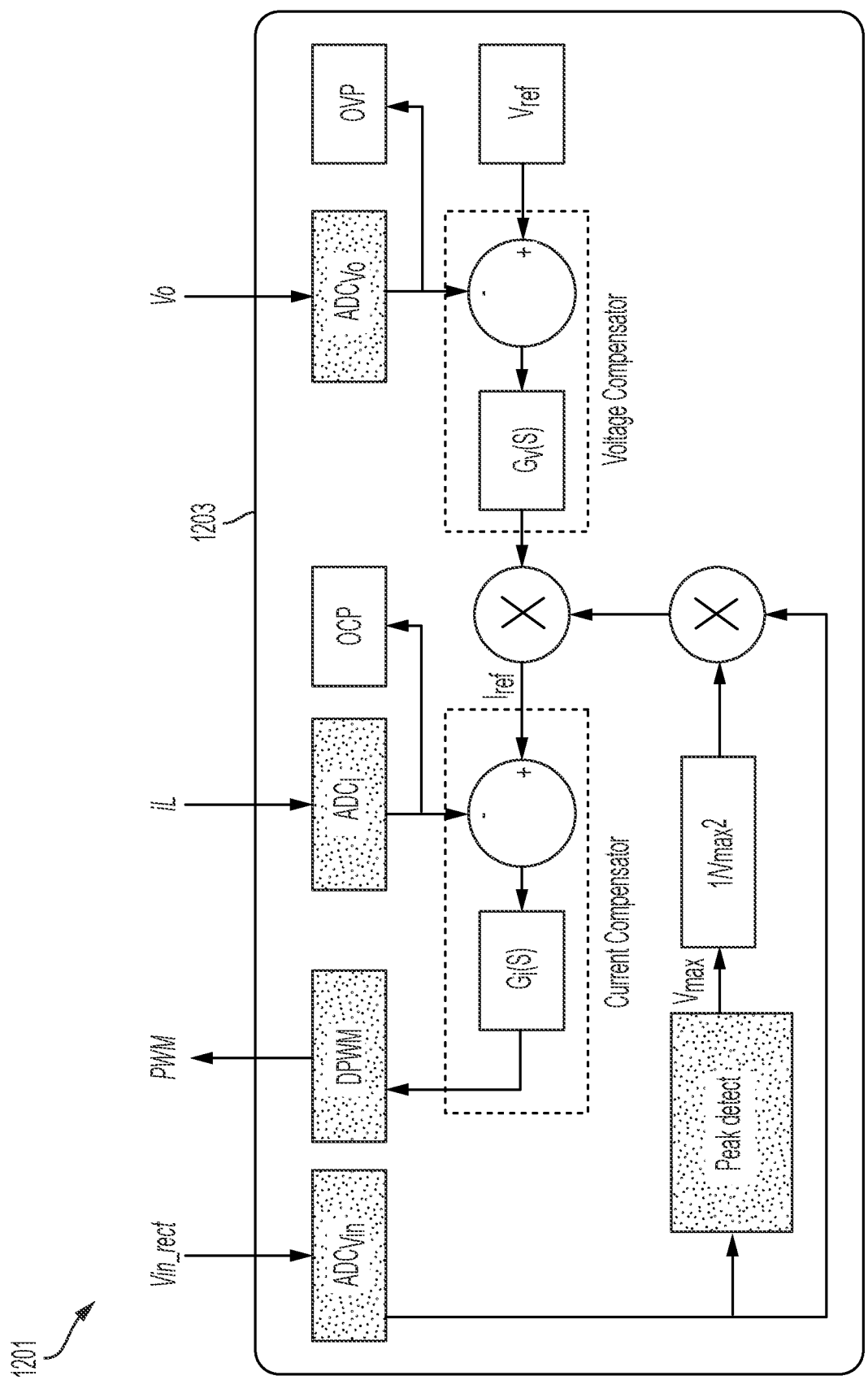
FIG. 16 is a block diagram of an example digital signal processor (DSP) controller, according to another example embodiment of the present disclosure.

FIG. 16 illustrates an example control circuit 1201, according to another example embodiment of the present disclosure. The control circuit 1201 includes a digital signal processor (DSP) 1203, which may be used to control one more switches of a power converter. For example, the output signal PWM may be a pulse width modulation signal that controls switching of the switches Q3 and Q4 of the power converter 300 of FIG. 3A, etc.

The Vin_rect signal may be fed to two separate analog to digital (ADC) pins, to generate a difference inside the DSP 1203 for computation and control. For example, the DSP 1203 includes a peak detector that outputs a Vmax value to a 1/Vmax^2 block, which is multiplied with a signal from the ADCVin block that receives the signal Vin_rect.

The output bulk voltage Vo is received at the block ADCVo to provide feedback for voltage loop control. The output voltage is sent to a overvoltage protection block OVP, and also to a voltage compensator that determines a difference between the output voltage and a voltage reference Vref, and multiples with the input Vin_rect after a gain is applied at the block GV(s).

A current signal iL represents the current feedback information sensed from the current transformer (e.g., via the node 312 if FIG. 3B), for current loop control, and over-current protection via the block OCP. For example, the output of the combined Vin and Vo signals may provide a current reference Iref, and a difference between the sensed signal iL and the current reference Iref may be used to the PWM signal via a gain lock Gi(s) and the block DPWM.

Figure 17:
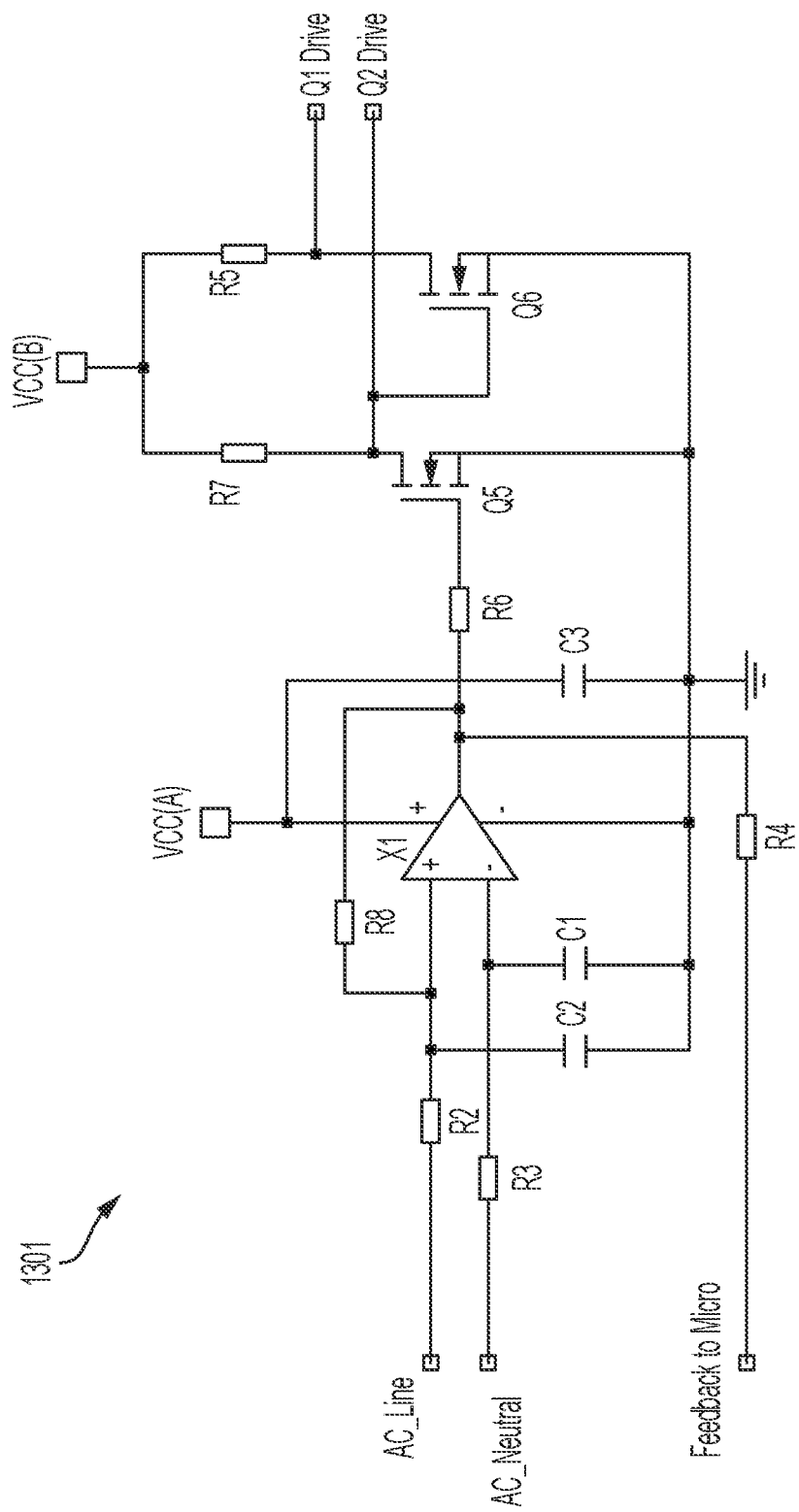
FIG. 17 is a block diagram of an analog control circuit, according to another example embodiment of the present disclosure.

FIG. 17 illustrates an analog control circuit 1301 for secondary sensing circuit switches (such as the switches Q1 and Q2 in the power converter 300 of FIG. 3B), according to another example embodiment of the present disclosure. The circuit 1301 receives input AC_Line and AC_Neutral (which may be sensed after a voltage divider, etc.), and compares the inputs using a comparator X1.

An output of the comparator X1 may be fed back to a microcontroller, etc., and the output may drive the switch Q5 via a resistor R6. The nodes VCC(A) and VCC(B) provide supply voltages for the comparator X1 and the switches Q5 and Q6. The gate of the switch Q6 is coupled to the drain of the switch Q5, so the switches Q5 and Q6 are alternately switched.

The circuit 1301 outputs a signal Q1 Drive to drive a switch Q1 of the secondary side sensing circuit (e.g., the switch Q1 of FIG. 3B), and the circuit 1301 outputs a signal Q2 Drive to drive a switch Q2 of the secondary side sensing circuit (e.g., the switch Q2 of FIG. 3B). Therefore, the circuit 1301 may alternately turn on and turn off the switches Q1 and Q2 according to a polarity of the AC voltage input, where the turn on and turn off events occur at a zero crossing of the AC voltage input.

The circuit 1301 includes three capacitors C1, C2 and C3, as well as six other resistors R2, R3, R4, R5, R7 and R8. In other embodiments, the circuit 1301 may include any other suitable arrangement of circuit components.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A bidirectional current sensing circuit for an AC/DC power converter, the circuit comprising:
   a first current transformer comprising:
      a primary winding coupled in series with a first current path of the AC/DC power converter; and
      a secondary winding;
   a first rectifier assembly coupled with the secondary winding of the first current transformer;
   a second current transformer comprising:
      a primary winding coupled in series with a second current path of the AC/DC power converter; and
      a secondary winding;
   a second rectifier assembly coupled with the secondary winding of the second current transformer;
   a first sense switch coupled with the first and second rectifier assemblies;
   a second sense switch coupled with the first and second rectifier assemblies;
   a control circuit configured to:
      turn on the first sense switch during a positive polarity of an AC voltage input of the AC/DC power converter to provide a first current path for both of the first and second rectifier assemblies; and
      turn on the second sense switch during a negative polarity of the AC voltage input to provide a second current path for both of the first and second rectifier assemblies.

2. The bidirectional current sensing circuit of claim 1, wherein the control circuit is further configured to:
   turn off the second sense switch during the positive polarity of the AC voltage input; and
   turn off the first sense switch during the negative polarity of the AC voltage input.

3. The bidirectional current sensing circuit of claim 1, wherein the secondary winding of the first current transformer comprises an untapped secondary winding that is not coupled in series with any other secondary winding of the first current transformer.

4. The bidirectional current sensing circuit of claim 1, wherein the first current path of the AC/DC power converter comprises a switched current path.

5. The bidirectional current sensing circuit of claim 1, wherein the control circuit is configured to turn on and turn off the first and second sense switches in synchronization with a line frequency of the AC voltage input and according to the polarity of the AC voltage input.

6. The bidirectional current sensing circuit of claim 1, wherein the control circuit is configured to turn on and turn off the first and second sense switches in response to a voltage of the AC voltage input crossing zero.

7. The bidirectional current sensing circuit of claim 1 further comprising a sense resistor, wherein:
the first sense switch is coupled with the second sense switch via a circuit node;
the sense resistor is coupled between the circuit node and a circuit ground; and
the control circuit is coupled with the circuit node and configured to detect a bidirectional current of the at least one power switch.

8. The bidirectional current sensing circuit of claim 1, wherein:
a first end of the first sense switch is coupled with a first end of the second sense switch via a circuit node;
the circuit node is coupled to a circuit ground;
a second end of the first sense switch is coupled with a first diode of the first rectifier assembly and with a first diode of the second rectifier assembly; and
a second end of the second sense switch is coupled with a second diode of the first rectifier assembly and with a second diode of the second rectifier assembly.

9. A method of manufacturing a power converter comprising:
coupling a first current transformer to a first power switch of a switched current path of a power factor correction circuit, the first current transformer comprising:
a primary winding coupled in series with the first power switch; and
a secondary winding;
coupling a first bridge rectifier with the secondary winding of the first current transformer;
coupling a second current transformer to the first current transformer, the second current transformer comprising:
a primary winding coupled to the primary winding of the first current transformer; and
a secondary winding;
coupling a second bridge rectifier with the secondary winding of the second current transformer;
coupling a first sense switch with the first and second rectifier assemblies;
coupling a second sense switch with the first and second rectifier assemblies;
turning on the first sense switch to create a first path to a circuit ground for each of the first and second rectifier assemblies; and
turning on the second sense switch to create a second path to the circuit ground for each of the first and second rectifier assemblies.

10. The method of claim 9 further comprising:
coupling a control circuit with the first and second sense switches; and
configuring the control circuit to:
turn on the first sense switch during a positive polarity of an AC voltage input into the power factor correction circuit; and
turn on the second sense switch during a negative polarity of the AC voltage.

11. The method of claim 10 further comprising configuring the control circuit to turn the first and second sense switches on and off in synchronization with a line frequency of the AC voltage and according to the polarity of the AC voltage.

12. The method of claim 11 further comprising configuring the control circuit to turn the first and second sense switches on and off in response to the AC voltage crossing zero.

13. The method of claim 10 further comprising:
coupling a sense resistor to the first sense switch via a circuit node;
coupling the sense resistor to the second sense switch via the circuit node; and
coupling the sense resistor to the circuit ground, the sense resistor positioned between the circuit node and the circuit ground.

14. The method of claim 13 further comprising:
coupling the control circuit to the circuit node; and
configuring the control circuit to detect a bidirectional current of the first power switch via the sense resistor.

15. The method of claim 10 further comprising configuring the control circuit to:
turn off the second sense switch during the positive polarity of the AC voltage input; and
turn off the first sense switch during the negative polarity of the AC voltage input.

16. A method of converting AC power to DC power comprising:
controlling at least one switch of a power factor correction circuit according to a switching frequency to generate a current in a switched current path of the power factor correction circuit;
controlling a first current sense switch into an on state to:
generate, via a first current transformer, a first sensing current in a first rectifier assembly; and
generate, via a second current transformer, a second sensing current in a second rectifier assembly;
controlling a second current sense switch into the on state to:
generate, via the first current transformer, a third sensing current in the first rectifier assembly; and
generate, via the second current transformer, a fourth sensing current in the second rectifier assembly.

17. The method of claim 16, further comprising:
receiving an AC voltage via a pair of input terminals;
detecting, via a control circuit, a voltage polarity of the AC voltage; and
wherein, in response to the voltage polarity being a positive polarity:
controlling the first current sense switch comprises controlling the first current sense switch into the on state; and
controlling the second current sense switch comprises controlling the second current sense switch into an off state.

18. The method of claim 17, wherein, in response to the voltage polarity being a negative polarity:
controlling the first current sense switch comprises controlling the first current sense switch into the off state; and
controlling the second current sense switch comprises controlling the second current sense switch into the on state.

19. The method of claim 16 further comprising detecting at least one of the first, second, third, and fourth sensing currents flowing through a sense resistor coupled to the first and second current sense switches.

20. The method of claim 19, wherein the first, second, third, and fourth sensing currents are included in secondary windings of the first and second current transformers via primary windings of the first and second current transformers in response to controlling the at least one switch of the power factor correction circuit according to the switching frequency.

\* \* \* \* \*

UNITED STATES PATENT AND TRADEMARK OFFICE
CERTIFICATE OF CORRECTION

| | | |
|---|---|---|
| PATENT NO. | : 11,557,982 B2 | Page 1 of 1 |
| APPLICATION NO. | : 17/376772 | |
| DATED | : January 17, 2023 | |
| INVENTOR(S) | : Rahul Vinaykumar Davare et al. | |

It is certified that error appears in the above-identified patent and that said Letters Patent is hereby corrected as shown below:

On the Title Page

Item (73) Assignee, delete "Astee" and insert --Astec--

In the Claims

Column 12, Claim 20, Line 65, delete "included" and insert --induced--

Signed and Sealed this
Twenty-first Day of January, 2025

Coke Morgan Stewart
*Acting Director of the United States Patent and Trademark Office*